(12) United States Patent
Varney et al.

(10) Patent No.: US 10,221,715 B2
(45) Date of Patent: Mar. 5, 2019

(54) TURBINE SHROUD WITH AXIALLY SEPARATED PRESSURE COMPARTMENTS

(71) Applicants: Rolls-Royce Corporation, Indianapolis, IN (US); Rolls-Royce North American Technologies, Inc., Indianapolis, IN (US)

(72) Inventors: Bruce E. Varney, Greenwood, IN (US); Daniel K. Vetters, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 613 days.

(21) Appl. No.: 15/048,271

(22) Filed: Feb. 19, 2016

(65) Prior Publication Data

US 2016/0258311 A1    Sep. 8, 2016

Related U.S. Application Data

(60) Provisional application No. 62/127,367, filed on Mar. 3, 2015.

(51) Int. Cl.
*F01D 11/08* (2006.01)
*F01D 25/12* (2006.01)

(52) U.S. Cl.
CPC .............. *F01D 11/08* (2013.01); *F01D 25/12* (2013.01); *F05D 2230/60* (2013.01); *F05D 2240/11* (2013.01); *F05D 2260/20* (2013.01); *F05D 2300/10* (2013.01); *F05D 2300/6033* (2013.01); *Y02T 50/672* (2013.01)

(58) Field of Classification Search
CPC .......... F01D 11/08; F01D 11/24; F01D 25/08; F01D 25/14; F01D 25/145; F01D 25/24; F01D 25/243; F01D 25/246; F01D 25/26; F01D 25/28; F01D 25/12; F05D 2230/60; F05D 2300/10; F05D 2260/20; F05D 2300/6033; F05D 2240/11
See application file for complete search history.

(56) References Cited

U.S. PATENT DOCUMENTS 4,526,226 A * 7/1985 Hsia ................... F01D 5/187
                                                165/109.1
4,679,981 A * 7/1987 Guibert ............... F01D 11/08
                                                415/116
5,562,408 A    10/1996 Proctor et al.
(Continued)

FOREIGN PATENT DOCUMENTS

EP    0690205 A2    1/1996
EP    1965030 A2    9/2008
EP    1990507 A1    11/2008

OTHER PUBLICATIONS

Extended European Search Report, European Application No. 16156614. 6-1610, dated Jul. 15, 2016, 8 pages.
(Continued)

*Primary Examiner* — Eldon Brockman
(74) *Attorney, Agent, or Firm* — Barnes & Thornburg LLP

(57) ABSTRACT

A turbine shroud for a gas turbine engine includes an annular metallic carrier and a blade track. One or more cavities are formed between the carrier and blade track to provide cooling air to the blade track.

20 Claims, 2 Drawing Sheets

(56) References Cited

U.S. PATENT DOCUMENTS

| | | | |
|---|---|---|---|
| 5,593,278 A * | 1/1997 | Jourdain | F01D 11/18 |
| | | | 415/116 |
| 6,425,736 B1 * | 7/2002 | McMahon | F01D 9/042 |
| | | | 415/173.4 |
| 6,612,808 B2 | 9/2003 | Lee et al. | |
| 6,884,026 B2 | 4/2005 | Glynn et al. | |
| 7,063,503 B2 * | 6/2006 | Meisels | F01D 25/24 |
| | | | 415/116 |
| 7,306,424 B2 | 12/2007 | Romanov et al. | |
| 8,246,299 B2 | 8/2012 | Razzell et al. | |
| 8,529,201 B2 | 9/2013 | Lutjen et al. | |
| 8,814,507 B1 | 8/2014 | Campbell et al. | |
| 9,745,854 B2 * | 8/2017 | Baldiga | F01D 5/225 |
| 2005/0232752 A1 | 10/2005 | Meisels | |
| 2006/0083607 A1 * | 4/2006 | Synnott | F01D 11/08 |
| | | | 415/173.1 |
| 2007/0280820 A1 * | 12/2007 | Roberts | F01D 11/08 |
| | | | 415/139 |
| 2009/0035125 A1 * | 2/2009 | Fujimoto | F01D 11/24 |
| | | | 415/116 |
| 2015/0377050 A1 * | 12/2015 | Freeman | F01D 11/08 |
| | | | 416/185 |

OTHER PUBLICATIONS

European Office Action, European Application No. 16156614.6-1610, dated Jul. 25, 2017, 5 pages.

* cited by examiner

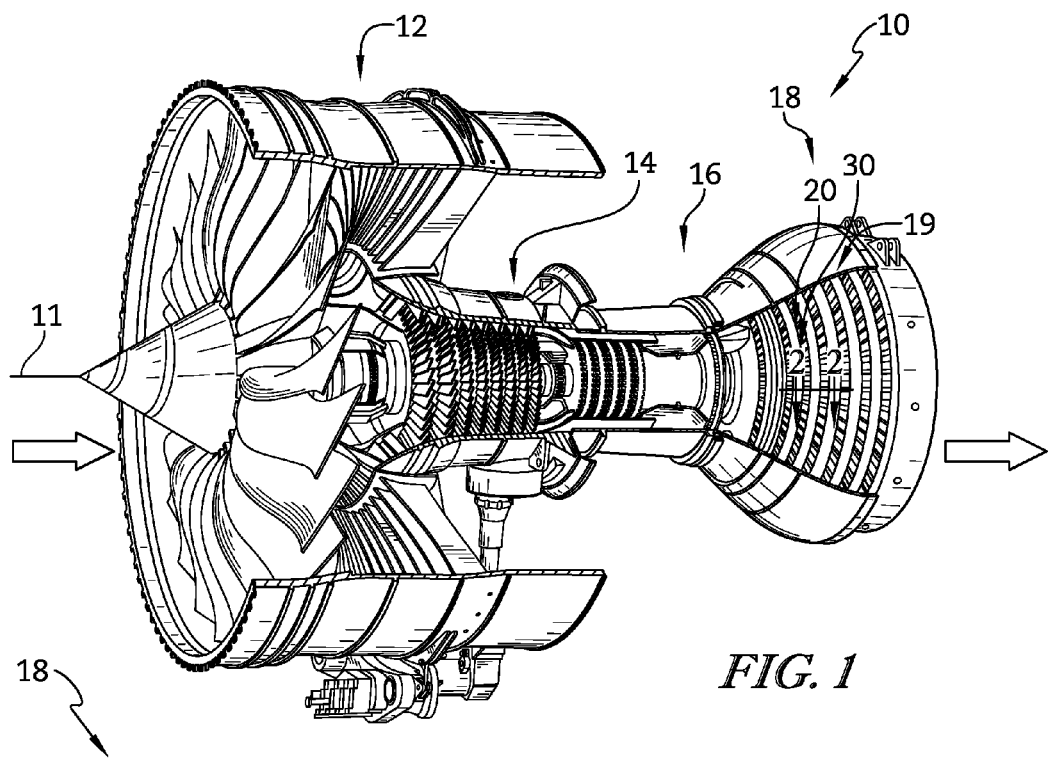
FIG. 1
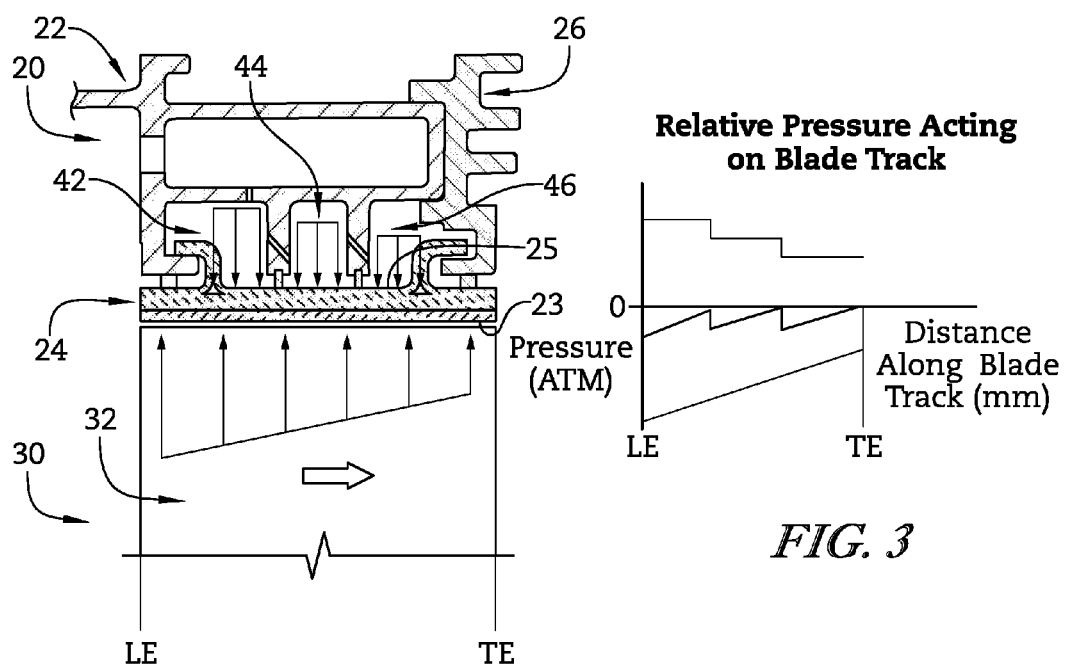
FIG. 2
FIG. 3

TURBINE SHROUD WITH AXIALLY SEPARATED PRESSURE COMPARTMENTS

CROSS REFERENCE TO RELATED APPLICATIONS

This application claims priority to and the benefit of U.S. Provisional Patent Application No. 62/127,367, filed 3 Mar. 2015, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have low torsional rigidity. Due to the low torsional rigidity, the components of some turbine shrouds experience high stress levels when differential pressures are applied along their length. For example, exposing such components to differential pressures may reduce their useful lives in service.

SUMMARY

The present application discloses one or more of the features recited in the appended claims and/or the following features which, alone or in any combination, may comprise patentable subject matter.

According to one aspect of the present disclosure, a turbine shroud for use in a gas turbine engine includes a carrier, a blade track, and at least one bulkhead. The carrier may comprise metallic materials and be adapted to be coupled to a turbine case. The blade track may comprise ceramic-matrix composite materials and be coupled to the carrier. The blade track may extend at least a portion of the way around a central axis so that the blade track is adapted to block hot gasses from passing over a turbine wheel surrounded by the turbine shroud. The at least one bulkhead may radially interconnect the carrier and the blade track to divide a space between the carrier and the runner into at least a first cooling-air cavity and a second cooling-air cavity. The at least one bulkhead may be formed to include a plurality of pressure-control holes sized to cause the first cooling-air cavity to have a first pressure and the second cooling-air cavity to have a second pressure, lower than the first pressure.

In illustrative embodiments, each of the pressure-control holes may include a first end positioned to pass air from the first cooling-air cavity into the pressure-control hole and a second end positioned to pass air from the pressure-control hole into the second cooling-air cavity, and wherein the first end is positioned radially outward of the second end.

In illustrative embodiments, the blade track may include a plurality of blade track segments positioned to surround the turbine wheel. Each blade track segment may include a runner that extends a portion of the way around the central axis so that the runner is adapted to block hot gasses from passing over the turbine wheel surrounded by the turbine shroud, a forward hanger that extends radially outward from the runner, and an aft hanger spaced axially from the forward hanger that extends radially outward from the runner.

In illustrative embodiments, the at least one bulkhead may comprise a first bulkhead located axially between the forward hanger and the aft hanger and a second bulkhead located axially between the first bulkhead and the aft hanger. The second bulkhead may radially interconnect the carrier and the runner to divide a space between the carrier and the runner into the second cooling-air cavity and a third cooling-air cavity.

In illustrative embodiments, the first bulkhead may be formed to include a first portion of the plurality of pressure-control holes and the second bulkhead may be formed to include a second portion of the plurality of pressure-control holes to cause the second cooling-air cavity to have the second pressure and the third cooling-air cavity to have a third pressure, lower than the second pressure.

In illustrative embodiments, each of the first and second bulkheads may include a divider that extends radially inward from the carrier and be formed to include the pressure-control holes and a seal member that interconnects the divider and the runner of the blade track segment.

In illustrative embodiments, each of the pressure-control holes in the first portion may include a first end positioned to pass air from the first cooling-air cavity into the pressure-control hole and a second end positioned to pass air from the pressure-control hole into the second cooling-air cavity. The first end may be positioned radially outward of the second end.

In illustrative embodiments, each of the pressure-control holes in the second portion may include a third end positioned to pass air from the second cooling-air cavity into the pressure-control hole and a fourth end positioned to pass air from the pressure-control hole into the third cooling-air cavity. The third end may be positioned radially outward of the fourth end.

In illustrative embodiments, the carrier may include a diffuser and a carrier hanger coupled to the diffuser. The carrier hanger may be positioned to support the diffuser. The diffuser may be positioned to provide cooling air to the first cooling-air cavity.

In illustrative embodiments, the diffuser may define a cooling air diffuser plenum in fluid communication with the first cooling-air cavity by a cavity supply aperture.

In illustrative embodiments, the diffuser may be formed to include at least one diffuser inlet aperture positioned to pass air into the cooling air diffuser plenum.

In illustrative embodiments, the at least one bulkhead may be coupled to a radially inner portion of the cooling air diffuser plenum.

In illustrative embodiments, the carrier may further include a forward bracket coupled to the diffuser and positioned to support the forward hanger of the blade track to couple the blade track with the carrier.

In illustrative embodiments, the turbine shroud may further include a seal member positioned between the forward bracket and the blade track.

In illustrative embodiments, the turbine shroud may further include a retainer coupled to the carrier. The retainer may include a diffuser mount and a retainer hanger coupled to the diffuser mount. The retainer hanger may be positioned to support the diffuser mount. The diffuser mount may be positioned to engage the diffuser of the carrier.

In illustrative embodiments, the retainer may further include an aft bracket coupled to the diffuser mount and positioned to support the aft hanger of the blade track to couple the blade track with the retainer.

In illustrative embodiments, the turbine shroud may further include a seal member positioned between the aft bracket and the blade track.

According to another aspect of the present disclosure, a turbine shroud for use in a gas turbine engine includes a carrier, a retainer, a blade track, and at least one bulkhead. The carrier may comprise metallic materials and be adapted to be coupled to a turbine case. The retainer may comprise metallic materials and be adapted to be coupled to the turbine case. The retainer may be coupled to the carrier. The blade track may comprise ceramic-matrix composite materials and extend around a central axis so that the blade track is adapted to block hot gasses from passing over a turbine wheel. The blade track may be positioned to engage with the carrier and retainer to maintain alignment of the blade track with the turbine wheel.

In illustrative embodiments, the at least one bulkhead may radially interconnect the carrier and the blade track to divide a space between the carrier and the runner into at least a first cooling-air cavity and a second cooling-air cavity. The at least one bulkhead may be configured to provide means for creating a pressure differential between subsequent cooling-air cavities such that the each subsequent cooling-air cavity has a pressure lower than the upstream cooling-air cavity.

In illustrative embodiments, the at least one bulkhead may include a divider extending radially inward from the carrier and a seal member positioned between the divider and the blade track.

In illustrative embodiments, the dividers may be formed to include a plurality of pressure-control holes and each of the pressure-control holes extends between an axially forward first end and an axially aft second end. The axially forward first end may be positioned radially outward of the axially aft second end.

In illustrative embodiments, the blade track may be formed to include grooves to allow cooling air located in the first cooling-air cavity to pass between the blade track and the seal member into the second cooling-air cavity.

In illustrative embodiments, the seal member may be configured to allow cooling air located in the first cooling-air cavity to pass between the blade track and the seal member into the second cooling-air cavity.

In illustrative embodiments, the seal member may be formed to include one or more apertures extending between the first cooling-air cavity and the second cooling-air cavity.

According to another aspect of the present disclosure, a method of assembling a turbine shroud for use in a gas turbine engine may include engaging a forward hanger of a blade track with a forward bracket of a carrier, engaging a runner of the blade track with a bulkhead of the carrier, the runner being coupled to the forward hanger, and engaging an aft bracket of a retainer with an aft hanger coupled to the runner of the blade track. The bulkhead may divide a spaced defined by the carrier, blade track, and retainer into an axially forward first cavity and an axially aft second cavity. The first and second cavities may be in fluid communication with one another by a plurality of pressure-control holes formed through the bulkhead and sized to cause the first cavity to have a first pressure and the second cavity to have a second pressure, lower than the first pressure.

These and other features of the present disclosure will become more apparent from the following description of the illustrative embodiments.

BRIEF DESCRIPTION OF THE DRAWINGS

FIG. 1 is a cut-away perspective view of a gas turbine engine including, from left to right, a fan assembly, a compressor, a combustor, and a turbine;

FIG. 2 is a cross-sectional view of a portion of the turbine in FIG. 1 showing a turbine shroud providing a track for blades of a turbine wheel assembly and suggesting pressure loads applied radially outward and inward on a blade track component of the turbine shroud;

FIG. 3 is a graph showing the relative pressure loads acting radially outward and inward on the blade track of FIG. 2.

DETAILED DESCRIPTION OF THE DRAWINGS

Figure 4:
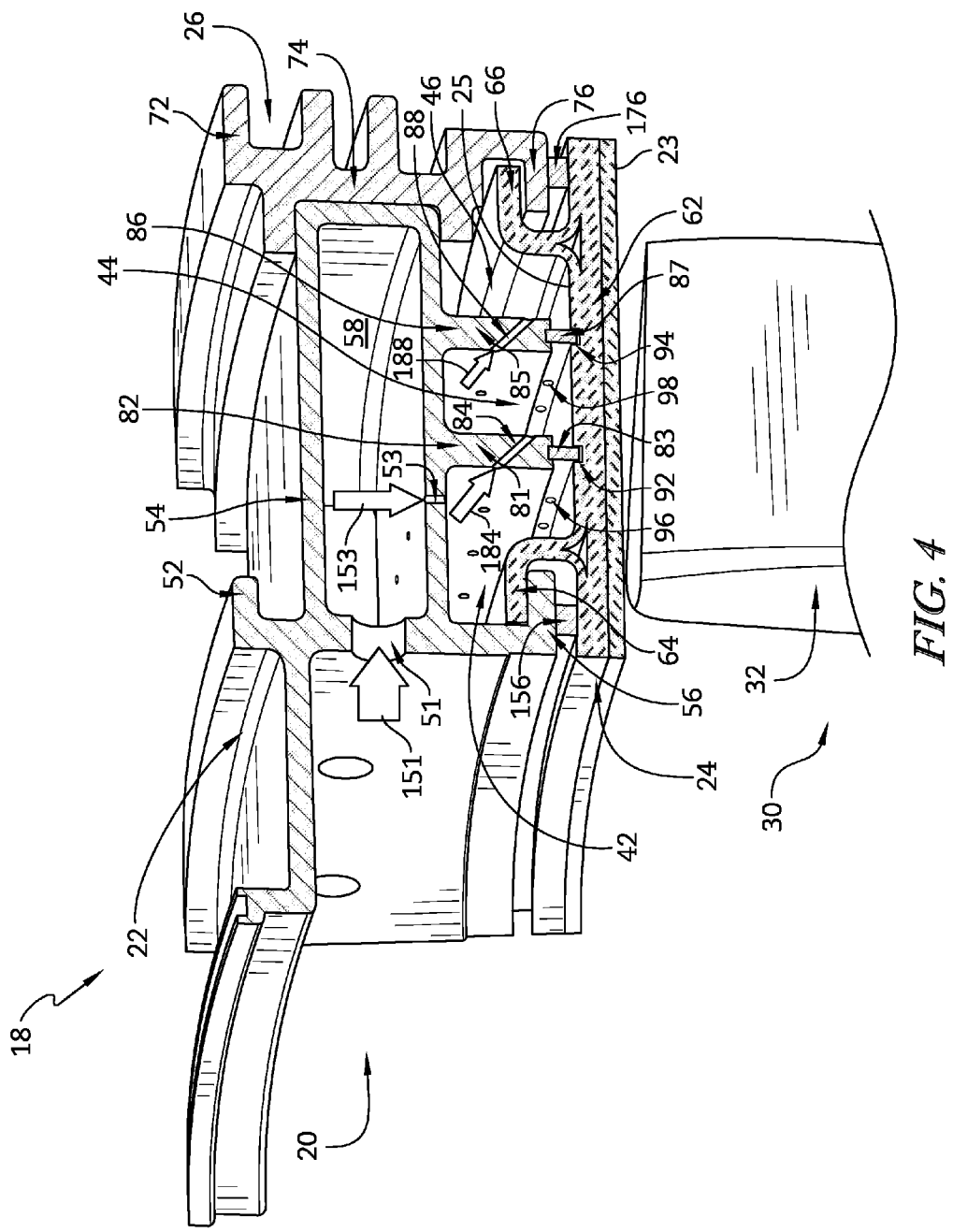
FIG. 4 is a detail perspective view of the turbine shroud shown in FIG. 2 showing that the turbine shroud includes a plurality of pressurized cavities outward of the blade track that apply radially-inward force on the blade track.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes a fan assembly 12, a compressor 14, a combustor 16, and a turbine 18. The fan assembly 12 pushes air through the engine 10 to propel an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan assembly 12.

The turbine 18 illustratively includes at least one turbine wheel assembly 30 and a turbine shroud 20 positioned to surround the turbine wheel assembly 30 as shown in FIG. 2. The turbine wheel assembly 30 includes a plurality of blades 32 coupled to a rotor disk for rotation therewith. The hot, high pressure combustion products from the combustor 16 are directed toward the blades 32 of the turbine wheel assemblies 30. The blades 32 are in turn pushed by the combustion products to cause the turbine wheel assembly 30 to rotate; thereby, driving the rotating components of the compressor 14 and/or the fan assembly 12.

The turbine shroud 20 extends around the turbine wheel assembly 30 to block combustion products from passing over the blades 32 without pushing the blades 32 to rotate as suggested in FIGS. 2 and 4. The turbine shroud 20 illustratively includes a carrier 22, a blade track 24, and a retainer 26. The carrier 22 is an annular, round metallic component and is configured to support the blade track 24 in position adjacent to the blades 32 of the turbine wheel assembly 30. The illustrative blade track 24 is generally concentric with and nested into the carrier 22 along a rotational axis 11 of the engine 10. The retainer 26 engages both the carrier 22 and the blade track 24 to position the carrier 22 and the blade track 24 relative to other static turbine components. The turbine shroud 20 is coupled to an outer case 19 of the gas turbine engine 10.

In some embodiments, the turbine shroud 20 is made up of a number of segments that extend only part-way around the axis 11 which cooperate to surround the turbine wheel assembly 30. In other embodiments, the turbine shroud 20 is annular and non-segmented to extend fully around the axis 11 and surround the turbine wheel assembly 30. In yet other embodiments, portions of the turbine shroud 20 are segmented while other portions are annular and non-segmented. In one example, the blade track 24 is a unitary, one-piece hoop while the carrier 22 and retainer 26 are segmented and positioned to circumferentially surround the blade track 24. In such an example, the blade track 24 is cross-keyed with the carrier 22 and retainer 26 or includes one or more hangers to maintain position of the blade track 24 relative to the carrier 22 and retainer 26. In another example, the blade track 24 is segmented while the carrier 22 and retainer 26 are annular, one-piece structures. In such an example, the blade track 24 includes one or more hangers to maintain position of the blade track 24 relative to the carrier 22 and retainer 26.

The pressure of the combustion products flowing from the combustor 16 through the turbine 18 decreases as work is done on the blades 32 by the combustion products rotating the wheel assembly 30 as suggested in FIGS. 2 and 3. For example, the pressure of the combustion products is higher at a leading end LE of the turbine wheel assembly 30 than at a trailing end TE of the turbine wheel assembly 30. As such, higher pressures are exerted on a radially inner surface 23 of the blade track 24 at a leading end LE than at a trailing end TE. This pressure differential can create an undesired torque on the blade track 24.

To counteract the differential pressures acting on the inner surface 23 of the blade track 24, a plurality of differentially pressurized cavities 42, 44, 46 are illustratively formed along a radially outer surface 25 of the blade track 24 as shown in FIG. 2. The cavities 42, 44, 46 are pressurized with air flowing from the compressor 14. In the illustrative embodiment, a first cavity 42 positioned at the leading end LE of the blade track 24 has a higher pressure than a second cavity 44 positioned substantially at a center of the blade track 24. Similarly, the second cavity 44 has a higher pressure than a third cavity 46 positioned at the trailing end TE of the blade track 24.

The varying pressures of the cavities 42, 44, 46 apply forces to the outer surface 25 of the blade track 24 and reduce the relative pressure differential acting on the leading end LE and trailing end TE of the blade track 24 as suggested in FIGS. 2 and 3. In one embodiment, the pressure within each cavity 42, 44, 46 is determined based on the number of cavities used and position of the cavity 42, 44, 46. For example, the difference in pressure between each cavity will be smaller if four cavities are used as compared to if three cavities are used. Additionally, cavities positioned toward the leading end LE of the blade track 24 will have higher pressures than cavities positioned toward the trailing end TE of the blade track 24.

In the illustrative embodiment, the turbine shroud 20 includes the carrier 22, the blade track 24, and the retainer 26 as shown in FIG. 4. The carrier 22 is a metallic component adapted to support the rest of the turbine shroud 20 and to be coupled to the rest of the engine 10. The blade track 24 is a ceramic-matrix composite component mounted to the carrier 22 and adapted to withstand the high temperature gasses that act on the turbine blades 30. The retainer 26 engages aft sides of the carrier 22 and the blade track 24 to hold the blade track 24 in place relative to the carrier 22.

The carrier 22 includes a diffuser 54, a case hanger 52 coupled to a radially outer portion of the diffuser 54, and a forward bracket 56 coupled to a radially inner portion of the diffuser 54 as shown in FIG. 4. The diffuser 54 receives and distributes air from the compressor 14 to the first cavity 42. The case hanger 52 is adapted to couple the carrier 22 to the outer case 19. The forward bracket 56 has an L-shape and engages the blade track 24 to couple the blade track 24 to the carrier 22.

The blade track 24 includes a runner 62, a forward hanger 64 coupled to radially outer surface 25, and an aft hanger 66 spaced apart from the forward hanger 64 and coupled to the radially outer surface 25 as shown in FIG. 4. The runner 62 extends circumferentially around at least a portion of the axis 11 and blocks gasses from passing over the blades 30 by defining an outer boundary of the gas path moving across the blades 30. The forward hanger 64 has an L-shape and engages the bracket 56 of the carrier 22 to couple the blade track 24 to the carrier 22.

The retainer 26 includes a diffuser mount 74, a case hanger 72 coupled to a radially outer portion of the diffuser mount 74, and an aft bracket 76 coupled to a radially inner portion of diffuser mount 74. The diffuser mount 74 engages with the diffuser 54 of the carrier 22 to support an aft end of the diffuser 54. The case hanger 72 is adapted to couple the retainer 26 to the outer case 19. The aft bracket 76 of the retainer 26 engages with the aft hanger 66 of the blade track 24.

In the illustrative embodiment, the blade track 24 is trapped axially between and supported by the forward bracket 56 and aft bracket 76 as shown in FIG. 4. A seal member 156 is positioned between the forward bracket 56 and the blade track 24 to seal a portion of the first cavity 42. A seal member 176 is positioned between the aft bracket 76 and the blade track 24 to seal a portion of the third cavity 46. Alternatively, the seal member 156 is positioned between the forward bracket 56 and forward hanger 64 and the seal member 176 is positioned between the aft bracket 76 and aft hanger 66. The case hangers 52, 72 are positioned to support the assembled turbine shroud 20 on the outer case 19 of the gas turbine engine 10.

A pair of bulkheads 82, 86 are coupled to the diffuser 54 and at least partially define the pressurized cavities 42, 44, 46 as shown in FIG. 4. The bulkheads 82, 86 extend radially inward from the diffuser 54 and engage with the radially outer surface 25 of the blade track 24. A forward bulkhead 82 is axially positioned between the forward hanger 64 and the aft hanger 66 of the blade track 24 when the blade track 24 is coupled to the carrier 22. An aft bulkhead 86 is spaced apart from the forward bulkhead 82 and axially positioned between the forward bulkhead 82 and the aft hanger 66. While two bulkheads 82, 86 are shown, more or less bulkheads are used depending on the number of cavities being created.

The forward bulkhead 82 includes a divider 81 coupled to diffuser 54 and a seal member 83 positioned between the divider 81 and blade track 24 as shown in FIG. 4. Similarly, the aft bulkhead 86 includes a divider 85 coupled to diffuser 54 and a seal member 87 positioned between the divider 85 and blade track 24. The divider 81 is formed to include at least one pressure-control hole 84. Similarly, the divider 85 is formed to include at least one pressure-control hole 88. The pressure-control holes 84, 88 provide fluid communication between the pressurized cavities 42, 44, 46.

The diffuser 54 of the carrier 22 defines a cooling air diffuser plenum 58 and is formed to include at least one diffuser inlet aperture 51. The diffuser inlet aperture 51 is positioned to pass cooling air received from the compressor 14 and/or fan assembly 12 into the cooling air diffuser plenum 58 as suggested by arrow 151. The diffuser 54 distributes the cooling air such that the cooling air diffuser plenum 58 has a substantially even pressure throughout.

The diffuser 54 is also formed to include at least one cavity supply aperture 53 which provides fluid communication between the cooling air diffuser plenum 58 and the first pressurized cavity 42 as shown in FIG. 4. Cooling air within the cooling air diffuser plenum 58 is passed into the first cavity 42 through the cavity supply aperture 53, as suggested by arrow 153. The cooling air enters the first cavity 42 such that the first cavity 42 has a substantially even pressure throughout.

Cooling air within the first cavity 42 is passed into the second cavity 44 through pressure-control hole 84 as suggested by arrow 184 in FIG. 4. The cooling air enters the second cavity 44 such that the second cavity 44 has a substantially even pressure throughout. Similarly, cooling air within the second cavity 44 is passed into the third cavity 46 through pressure-control hole 88 as suggested by arrow 188. The cooling air enters the third cavity 46 such that the third cavity 44 has a substantially even pressure throughout. In some embodiments, seal members 83, 87 are formed and positioned to allow cooling air to pass between the cavities 42, 44, 46 instead of, or in conjunction with, the pressure-control holes 84, 88. In other embodiments, grooves 92, 94 are formed in the outer surface 25 of the blade track 24 to allow cooling air to pass between the cavities 42, 44, 46 underneath the seal members 83, 87 instead of, or in conjunction with, the pressure-control holes 84, 88. In yet other embodiments, seal members 83, 87 are formed to include pressure-control holes 96, 98 to allow cooling air to pass between the cavities 42, 44, 46 instead of, or in conjunction with, the pressure-control holes 84, 88.

Pressure-control holes 84, 88 are formed at an axially aft and radially inward slope to direct incoming cooling air toward the blade track 24 as shown in FIG. 4. For example, the pressure-control hole 84 includes a first end associated with the first cavity 42 and a second end associated with the second cavity 44 that is positioned radially inward of the first end. Similarly, the pressure-control hole 88 includes a first end associated with the second cavity 44 and a second end associated with the third cavity 46 that is positioned radially inward of the first end. In some embodiments, pressure-control holes 84, 88 are positioned substantially parallel with rotational axis 11 of the gas turbine engine 10. The cavity supply aperture 53 is positioned substantially perpendicular to rotational axis 11 and directs incoming cooling air toward the blade track 24. In some embodiments, cavity supply aperture 53 may be angled relative to rotational axis 11 instead of being perpendicular with rotational axis 11.

In the illustrative embodiment, the size of arrows 151, 153, 184, 188 represents the amount of cooling air flowing through the associated holes or apertures. For example, more cooling air is flowing into the first cavity 42, as represented by arrow 153, than is flowing out of the first cavity 42, as represented by arrow 184. The relative differential in flow provides the first cavity 42 with a first pressure. Similarly, more cooling air is flowing into the second cavity 44, as represented by arrow 184, than is flowing out of the second cavity 44, as represented by arrow 188. The relative differential in flow provides the second cavity 44 with a second pressure which is lower than the first pressure within the first cavity 42. More cooling air is also flowing into the third cavity 46, as represented by arrow 188, than is flowing out of the third cavity 46 moving axially aft through gaps along interfaces with the retainer 26. The relative differential in flow provides the third cavity 46 with a third pressure which is lower than the second pressure within the second cavity 44.

In some embodiments, the relative size of the holes and apertures within the turbine shroud 20 provides the differential amounts of flow through the pressurized cavities 42, 44, 46. In some embodiments, the relative number of holes and apertures within the turbine shroud 20 provides the differential amounts of flow through the pressurized cavities 42, 44, 46. In some embodiments, the relative size and number of holes and apertures within the turbine shroud 20 provides the differential amounts of flow through the pressurized cavities 42, 44, 46.

In the illustrative embodiment, the blade track 24 is formed from ceramic containing materials as shown in FIG. 4. In some embodiments, the blade track 24 is formed from ceramic-matric composite (CMC) materials. In other embodiments, the blade track 24 may be formed from metallic or metallic alloy materials. The blade track 24 is positioned to surround the blades 32 of turbine wheel assembly 30. The blades 32 may be formed from metallic or metallic alloy materials, or from ceramic containing materials, such as CMC for example. The carrier 22 and retainer 26 are formed from metallic or metallic alloy materials. In some embodiments, the carrier 22 and retainer 26 are formed from ceramic containing materials, such as CMC for example.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for use in a gas turbine engine, the turbine shroud comprising a carrier comprising metallic materials and adapted to be coupled to a turbine case, a blade track comprising ceramic-matrix composite materials and coupled to the carrier, the blade track including a runner extending at least a portion of the way around a central axis so that the runner is adapted to block hot gasses from passing over a turbine wheel surrounded by the turbine shroud, and at least one bulkhead included in the carrier that radially interconnects the carrier and the runner to effect engagement between the carrier and the runner and to divide a space between the carrier and the runner into at least a first cooling-air cavity and a second cooling-air cavity, the at least one bulkhead formed to include a plurality of pressure-control holes sized to cause the first cooling-air cavity to have a first pressure and the second cooling-air cavity to have a second pressure, lower than the first pressure.

2. The turbine shroud of claim 1, wherein each of the pressure-control holes includes a first end positioned to pass air from the first cooling-air cavity into the pressure-control hole and a second end positioned to pass air from the pressure-control hole into the second cooling-air cavity, and wherein the first end is positioned radially outward of the second end.

3. The turbine shroud of claim 1, wherein the blade track includes a plurality of blade track segments positioned to surround the turbine wheel, each blade track segment including a forward hanger that extends radially outward from the runner and an aft hanger spaced axially from the forward hanger that extends radially outward from the runner.

4. The turbine shroud of claim 3, wherein the at least one bulkhead comprises a first bulkhead located axially between the forward hanger and the aft hanger and a second bulkhead located axially between the first bulkhead and the aft hanger, wherein the second bulkhead radially interconnects the carrier and the runner to divide a space between the carrier and the runner into the second cooling-air cavity and a third cooling-air cavity.

5. The turbine shroud of claim 4, wherein the first bulkhead is formed to include a first portion of the plurality of pressure-control holes and the second bulkhead is formed to include a second portion of the plurality of pressure-control holes to cause the second cooling-air cavity to have the second pressure and the third cooling-air cavity to have a third pressure, lower than the second pressure.

6. The turbine shroud of claim 5, wherein each of the first and second bulkheads includes a divider that extends radially inward from the carrier and is formed to include the pressure-control holes and a seal member that interconnects the divider of each of the first and second bulkheads and the runner.

7. The turbine shroud of claim 6, wherein each of the pressure-control holes in the first portion includes a first end positioned to pass air from the first cooling-air cavity into the pressure-control hole and a second end positioned to pass air from the pressure-control hole into the second cooling-air cavity, wherein the first end is positioned radially outward of the second end, and wherein each of the pressure-control holes in the second portion includes a third end positioned to pass air from the second cooling-air cavity into the pressure-control hole and a fourth end positioned to pass air from the pressure-control hole into the third cooling-air cavity, and wherein the third end is positioned radially outward of the fourth end.

8. The turbine shroud of claim 3, wherein the carrier includes a diffuser and a carrier hanger coupled to the diffuser, the carrier hanger positioned to support the diffuser, and the diffuser positioned to provide cooling air to the first cooling-air cavity.

9. The turbine shroud of claim 8, wherein the diffuser defines a cooling air diffuser plenum in fluid communication with the first cooling-air cavity by a cavity supply aperture.

10. The turbine shroud of claim 9, wherein the diffuser is formed to include at least one diffuser inlet aperture positioned to pass air into the cooling air diffuser plenum.

11. The turbine shroud of claim 10, wherein the at least one bulkhead is coupled to a radially inner portion of the cooling air diffuser plenum.

12. The turbine shroud of claim 8, further comprising a seal member positioned between a forward bracket of the carrier and the blade track, wherein the forward bracket is coupled to the diffuser and positioned to support the forward hanger of the blade track to couple the blade track with the carrier.

13. The turbine shroud of claim 8, further comprising a retainer coupled to the carrier, the retainer including a diffuser mount and a retainer hanger coupled to the diffuser mount, the retainer hanger positioned to support the diffuser mount, and the diffuser mount positioned to engage the diffuser of the carrier.

14. The turbine shroud of claim 13, further comprising a seal member positioned between an aft bracket of the retainer and the blade track, wherein the aft bracket is coupled to the diffuser mount and positioned to support the aft hanger of the blade track to couple the blade track with the retainer.

15. A turbine shroud for use in a gas turbine engine, the turbine shroud comprising
    a carrier comprising metallic materials and adapted to be coupled to a turbine case,
    a retainer comprising metallic materials and adapted to be coupled to the turbine case, the retainer being coupled to the carrier,
    a blade track comprising ceramic-matrix composite materials and extending around a central axis so that the blade track is adapted to block hot gasses from passing over a turbine wheel, the blade track positioned to engage with the carrier and retainer to maintain alignment of the blade track with the turbine wheel, and
    at least one bulkhead that radially interconnects the carrier and the blade track to divide a space between the carrier and the runner into at least a first cooling-air cavity and a second cooling-air cavity downstream of the first cooling-air cavity,
    wherein the at least one bulkhead is configured to provide means for creating a pressure differential between the cooling-air cavities such that the second cooling-air cavity has a pressure lower than the first cooling-air cavity and the at least one bulkhead includes a divider extending radially inward from the carrier and a seal member positioned between the divider and the blade track.

16. A turbine shroud for use in a gas turbine engine, the turbine shroud comprising
    a carrier comprising metallic materials and adapted to be coupled to a turbine case,
    a retainer comprising metallic materials and adapted to be coupled to the turbine case, the retainer being coupled to the carrier,
    a blade track comprising ceramic-matrix composite materials and extending around a central axis so that the blade track is adapted to block hot gasses from passing over a turbine wheel, the blade track positioned to engage with the carrier and retainer to maintain alignment of the blade track with the turbine wheel, and
    at least one bulkhead that radially interconnects the carrier and the blade track to divide a space between the carrier and the runner into at least a first cooling-air cavity and a second cooling-air cavity downstream of the first cooling-air cavity, wherein the at least one bulkhead includes a divider extending radially inward from the carrier and a seal member positioned between the divider and the blade track.

17. The turbine shroud of claim 16, wherein the divider is formed to include a plurality of pressure-control holes and each of the pressure-control holes extends between an axially forward first end and an axially aft second end, and wherein the axially forward first end is positioned radially outward of the axially aft second end.

18. The turbine shroud of claim 16, wherein the blade track is formed to include grooves to allow cooling air located in the first cooling-air cavity to pass between the blade track and the seal member into the second cooling-air cavity.

19. The turbine shroud of claim 16, wherein the seal member is configured to allow cooling air located in the first cooling-air cavity to pass between the blade track and the seal member into the second cooling-air cavity and the seal member is formed to include one or more apertures extending between the first cooling-air cavity and the second cooling-air cavity.

20. A method of assembling a turbine shroud for use in a gas turbine engine, the method comprising
    engaging a forward hanger of a blade track with a forward bracket of a carrier,
    engaging a runner of the blade track with a bulkhead of the carrier, the runner being coupled to the forward hanger, and
    engaging an aft bracket of a retainer with an aft hanger coupled to the runner of the blade track,
    wherein the bulkhead divides a space defined by the carrier, blade track, and retainer into an axially forward first cavity and an axially aft second cavity, the first and second cavities being in fluid communication with one another by a plurality of pressure-control holes formed through the bulkhead and sized to cause the first cavity to have a first pressure and the second cavity to have a second pressure, lower than the first pressure.

* * * * *